No. 651,459. Patented June 12, 1900.
T. J. GRIFFIN.
CORE HOLDING AND DROPPING DEVICE FOR COTTON PRESSES.
(Application filed Feb. 4, 1897.)
(No Model.)
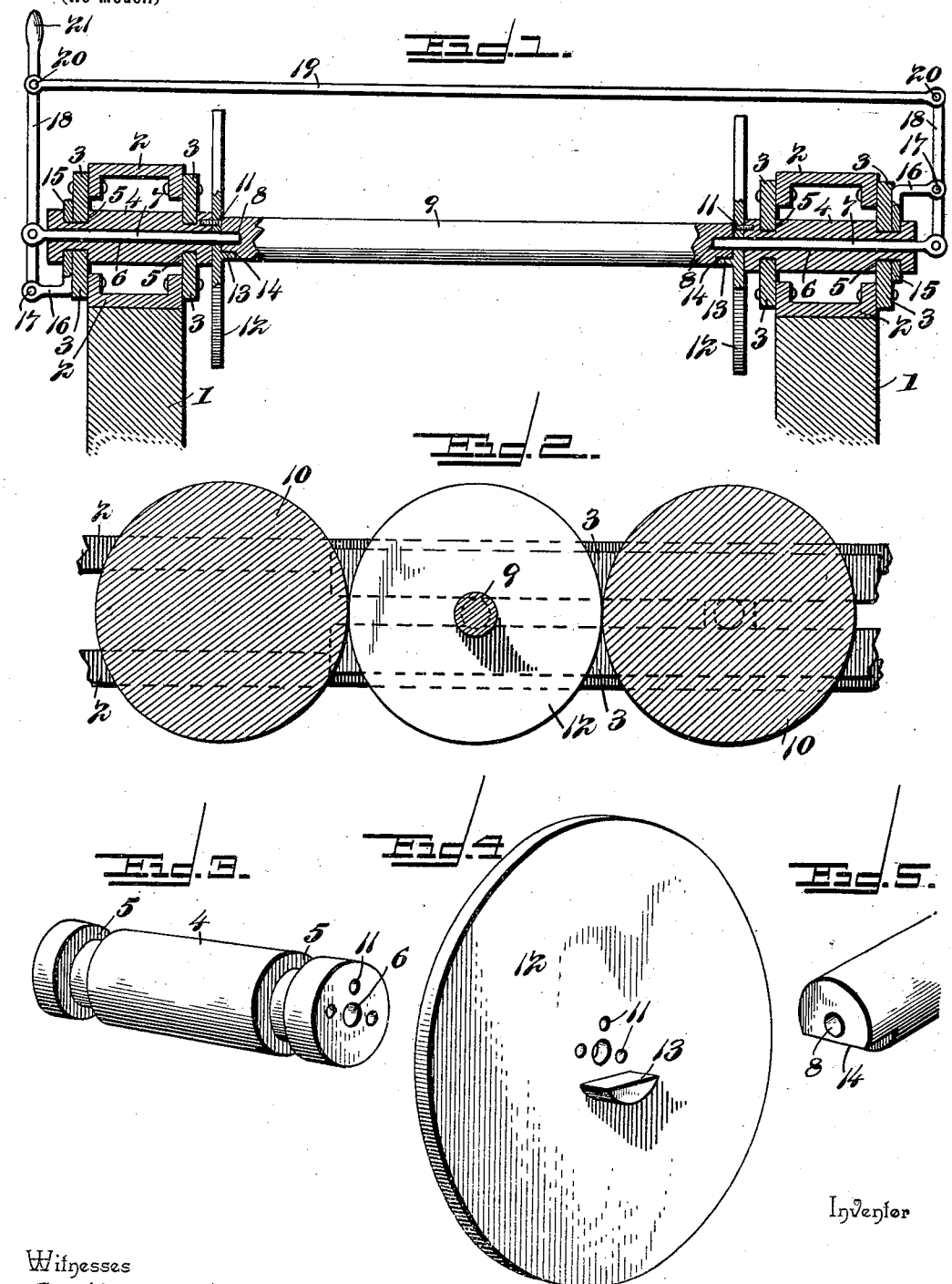

UNITED STATES PATENT OFFICE.

THOMAS J. GRIFFIN, OF GALVESTON, TEXAS, ASSIGNOR TO H. REIDEL, EDWARD McCARTHY, AND N. WEEKS, OF SAME PLACE, AND THE AMERICAN COTTON COMPANY, OF NEW YORK, N. Y.

CORE HOLDING AND DROPPING DEVICE FOR COTTON-PRESSES.

SPECIFICATION forming part of Letters Patent No. 651,459, dated June 12, 1900.

Application filed February 4, 1897. Serial No. 622,013. (No model.)

*To all whom it may concern:*

Be it known that I, THOMAS J. GRIFFIN, a citizen of the United States, residing at Galveston, in the county of Galveston and State of Texas, have invented a new and useful Core Holding and Dropping Device for Cotton-Compresses, of which the following is a specification.

This invention relates to core holding and dropping mechanism for cotton-compresses; and it has for its object to provide new and useful mechanism of this character having means for supporting the core-rod in position during the formation of the bale, while at the same time providing for the ready dropping of the bale, with the core-rod therein, when the bale is completed.

In carrying out the invention one of the principal objects thereof is to dispense with the iron core-rod that is usually employed in roller cotton-compresses, which rods are too heavy to remain within the bale and which very frequently in being removed therefrom injure the fiber. To overcome these objections, it is my purpose to substitute for the ordinary iron core a wooden core, which is sufficiently light so as not to materially increase the weight of the bale, and may therefore be allowed to remain in the bale without danger of injuring the fiber, as would be the case with an iron core-rod, which is susceptible to rusting. In connection with the use of a light inexpensive wooden core-rod to remain within the completed bale it is the purpose of the invention to provide novel and simple means for centering the core-rod for rotation within the press, and also for the quick and ready dropping thereof when the bale is completed.

With these and other objects in view, which will readily appear as the nature of the invention is better understood, the same consists in the novel construction, combination, and arrangement of parts hereinafter more fully described, illustrated, and claimed.

In the drawings, Figure 1 is a transverse sectional view of a portion of the frame of a roller cotton-compress, showing the core holding and dropping mechanism contemplated by the present invention. Fig. 2 is a longitudinal sectional view of a sufficient portion of a roller cotton-compress to illustrate the usual position of a core-rod therein. Fig. 3 is a detail in perspective of one of the rotating bearing-hubs. Fig. 4 is a detail in perspective of one of the guard heads or plates. Fig. 5 is a detail in perspective of one end of the wooden core-rod.

Referring to the accompanying drawings, the numerals 1 1 designate the opposite sides of the frame of an ordinary roller cotton-compress, and each of the frame sides is formed with parallel channel-iron frame-bars 2, spaced apart to form guideways therebetween and having attached to their outer and inner edges the guide-plates 3, which form guides and bearings for the rotary bearing-hubs 4, arranged to slide within the guideways of the frame sides between the upper and lower guide-plates 3, fitted to the parallel frame-bars 2. Each rotary bearing-hub 4 is cylindrical in form and is provided near its opposite ends with the annular bearing-grooves 5, receiving the adjacent edges of the upper and lower pairs of guide-plates 3. The engagement of the adjacent edges of the guide-plates 3 in the annular bearing-grooves 5 of each bearing-hub prevents the endwise movement of such hub and serves to take the longitudinal strain therefrom.

The bearing-hubs 4, mounted to slide longitudinally within diametrically-opposite portions of the frame sides, are formed with longitudinal openings 6, extending from end to end thereof and receiving therein longitudinally movable or sliding centering-pins 7, the inner ends of which pins are designed to project beyond the inner ends of the hubs 4 and loosely engage in the centering-sockets 8, formed in opposite ends of a wooden core-rod 9, which rod is adapted to be placed between the ordinary compression-rolls 10 of a roller cotton-compress, the bale being formed between the rolls 10 on the core-rod 9 in the usual manner.

The inner ends of the sliding and rotary bearing-hubs 4 have secured fast thereto, by studs or other suitable fastenings 11, circular guard heads or plates 12, which form end flanges for the core-rod and serve to confine the ends of the bale and build such ends evenly or uniformly to produce symmetrical and nicely-finished roll bales. The circular guard heads or plates at the inner ends of the bearing-hubs are provided at a central point with inwardly-extending squared clutch lugs or projections 13, adapted to register in the squared clutch-notches 14, formed at the ends of the wooden core-rod 9 to provide for interlocking the ends of the core-rod with the heads or plates 12, and thereby cause such heads or plates and the hubs to which they are attached to rotate with the core-rod as the bale is being formed thereon.

The annular bearing-grooves 5, near the outer ends of the bearing-hubs 4, are sufficiently large to receive therein the bracket-rings 15, which are carried by the bearing-hubs in their sliding movement longitudinally of the frame and are formed with off-standing fulcrum-arms 16, to which arms are pivoted at 17 the adjusting-levers 18. The adjusting-levers 18 at opposite sides of the press-frame are connected together for simultaneous movement by a connecting-rod 19, pivotally connected at its opposite ends, as at 20, respectively, with the oppositely-located levers, and one of said levers 18 is extended at its free end into a handle 21, which can be grasped by the operator to provide for simultaneously adjusting the oppositely-located pins 7 either inward or outward. One of the levers 18 is connected with its fulcrum 16 at one extremity, while the directly-opposite lever 18 is connected intermediate its ends with its fulcrum 16, so that a movement of the handle 21 in one direction will provide for the proper simultaneous adjustment of the centering-pins 7.

During the operation of the press the wooden core-rod 9 is supported for rotation on the inner ends of the centering-pins 7, and as the bale increases in size on the rod it is well understood that such rod moves longitudinally of the press-frame and necessarily carries therewith the bearing-hubs 4, which also rotate with the rod. The guard heads or plates 12 serve to confine the ends of the bale and make the same perfectly even, and when the bale is completed the handle 21 is grasped and moved in a direction that will simultaneously cause the inner ends of both centering-pins 7 to be withdrawn from the ends of the core-rod, thereby entirely releasing the core-rod and permitting the same, with its bale, to fall to the floor. A new core-rod can be readily replaced in position on the inner ends of the centering-pins when a new bale is to be formed.

While a wooden core-rod has been described in connection with the holding and dropping or releasing mechanism, it will of course be understood that such mechanism is equally as well adapted for holding and releasing an iron core-rod, and it will also be understood that various changes in the form, proportion, and the minor details of construction may be resorted to without departing from the principle or sacrificing any of the advantages of this invention.

Having thus described the invention, what is claimed, and desired to be secured by Letters Patent, is—

1. The combination with the opposite frame sides of a cotton-compress, and the core-rod having bearing-sockets in its ends, of bearing-hubs slidably and rotatably mounted in said frame sides and provided with longitudinal openings, centering-pins slidably mounted in the longitudinal openings of the hubs, guard heads or plates fitted to the inner ends of the bearing-hubs and having an interlocking connection with the ends of the core-rod, and lever connections with the outer ends of said centering-pins to provide for the simultaneous movement thereof, substantially as set forth.

2. The combination with the opposite frame sides of a cotton-compress having upper and lower pairs of parallel longitudinal guide-plates, and the core-rod having bearing-sockets in its ends, of bearing-hubs mounted to slide between said guide-plates and provided near their opposite ends with annular bearing-grooves receiving the edges of such plates, the outer annular grooves of the hubs being enlarged, centering-pins slidably mounted within longitudinal openings in the bearing-hubs, guard heads or plates fitted to the inner ends of the bearing-hubs and having an interlocking connection with the ends of the core-rod, bracket-rings fitted in the enlarged annular grooves of the bearing-hubs and having offstanding fulcrum-arms, adjusting-levers pivoted on said fulcrum-arms and connected with the outer ends of the centering-pins, and a connecting-rod pivotally connecting the oppositely-located adjusting-levers, substantially as set forth.

3. The combination with the frame of a roller cotton-compress, and the core-rod, of rotating hubs mounted to slide at opposite sides of the frame, guard-heads rigidly fitted to the inner ends of said hubs and having an interlocking connection with the ends of the core-rod, and means for simultaneously releasing the ends of the core-rod to permit of disengagement from the guard-heads, substantially as set forth.

In testimony that I claim the foregoing as my own I have hereto affixed my signature in the presence of two witnesses.

T. J. GRIFFIN.

Witnesses:
JOHN H. SIGGERS,
W. B. HUDSON.